(12) United States Patent
Blackburn et al.

(10) Patent No.: US 12,418,324 B2
(45) Date of Patent: Sep. 16, 2025

(54) COMMUNICATION SYSTEM HAVING BYPASS CONNECTOR ASSEMBLIES FOR MATING WITH AN ACTIVE MODULE

(71) Applicant: TE Connectivity Solutions GmbH, Schaffhausen (CH)

(72) Inventors: Christopher William Blackburn, Bothell, WA (US); Kyle Robert Sammon, San Francisco, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 45 days.

(21) Appl. No.: 18/439,284

(22) Filed: Feb. 12, 2024

(65) Prior Publication Data
US 2024/0396586 A1    Nov. 28, 2024

Related U.S. Application Data

(60) Provisional application No. 63/504,001, filed on May 24, 2023.

(51) Int. Cl.
*H04B 3/44*    (2006.01)
*H04B 3/36*    (2006.01)

(52) U.S. Cl.
CPC ............... *H04B 3/44* (2013.01); *H04B 3/36* (2013.01)

(58) Field of Classification Search
CPC ... H04B 3/44; H04B 3/36; H04Q 1/06; H04Q 1/16
See application file for complete search history.

(56) References Cited

U.S. PATENT DOCUMENTS

| 2002/0024261 | A1* | 2/2002 | Covaro | ................ H04B 10/508 307/149 |
| 2017/0302011 | A1* | 10/2017 | Wanha | ............... H01R 13/6587 |

\* cited by examiner

*Primary Examiner* — David S Huang

(57) ABSTRACT

A communication system includes a cartridge having panels forming a chamber. The panels include a first panel and a second panel different than the first panel. The cartridge includes first openings in the first panel and second openings in the second panel. The communication system includes cable connector assemblies received in the first openings. Each cable connector assembly includes a cable connector and cables extending from the cable connector. The cables define data channels. The communication system includes bypass connector assemblies received in the second openings. Each bypass connector assembly includes a bypass connector connected to the cables of the corresponding cable connector assemblies. An active module is coupled to the corresponding bypass connector assemblies. The active module includes a repeater device restoring signals transmitting along the data channels.

20 Claims, 10 Drawing Sheets

COMMUNICATION SYSTEM HAVING BYPASS CONNECTOR ASSEMBLIES FOR MATING WITH AN ACTIVE MODULE

CROSS REFERENCE TO RELATED APPLICATIONS

This application claims benefit to U.S. Provisional Application No. 63/504,001, filed 24-May-2023, titled "COMMUNICATION SYSTEM HAVING BYPASS CONNECTOR ASSEMBLIES FOR MATING WITH AN ACTIVE MODULE", the subject matter of which is herein incorporated by reference in its entirety.

BACKGROUND OF THE INVENTION

The subject matter herein relates generally to communication systems.

Cable assemblies are used to electrically connect various components within a system, such as a server or network system. The cable assemblies extend between the components, such as network, compute, storage, memory, or other components. The components may be arranged in shelves or trays of a network rack. Some systems may include components such as cards, such as line cards, daughter cards, mother boards, and the like. Each cable assembly includes multiple cables arranged in a bundle or array. Each cable forms a data channel. However, high speed channel budgets are decreasing as speeds increase, which results in shorter allowable cable lengths. Some systems utilize active devices, such as re-drivers or re-timers at the component interfaces to extend cable reach and enable smaller cable diameters. However, the cable lengths are limited at high data speeds. Additionally, incorporating the active devices at the component interfaces may be a less than ideal location for the active devices along the data channel. Repair and replacement of the active devices is also difficult when the active devices are incorporated into the component interfaces.

BRIEF DESCRIPTION OF THE INVENTION

In one embodiment, a communication system is provided and includes a cartridge having panels forming a chamber. The panels include a first panel and a second panel different than the first panel. The cartridge includes first openings in the first panel and second openings in the second panel. The communication system includes cable connector assemblies received in the first openings. Each cable connector assembly includes a cable connector and cables extending from the cable connector. The cables define data channels. The communication system includes bypass connector assemblies received in the second openings. Each bypass connector assembly includes a bypass connector connected to the cables of the corresponding cable connector assemblies. An active module is coupled to the corresponding bypass connector assemblies. The active module includes a repeater device restoring signals transmitting along the data channels.

In another embodiment, a communication system is provided and includes a cartridge having panels forming a chamber. The panels include a first panel and a second panel different than the first panel. The cartridge includes first openings in the first panel and second openings in the second panel. The communication system includes cable connector assemblies received in the first openings. Each cable connector assembly includes a cable connector and cables extending from the cable connector. The cables define data channels. The communication system includes bypass connector assemblies received in the second openings. Each bypass connector assembly includes a bypass connector connected to the cables of the corresponding cable connector assemblies. The communication system includes an active module removably coupled to the corresponding bypass connector assemblies. The active module includes a module circuit board, a first module connector mounted to the module circuit board, a second module connector mounted to the module circuit board, and a repeater device mounted to the module circuit board. The first and second module connectors being mated to the corresponding bypass connectors. The repeater device is located inline between the first and second module connectors. The repeater device restoring signals transmitting along the data channels.

In a further embodiment, a communication system is provided and includes a cartridge having panels forming a chamber. The panels include a first panel and a second panel different than the first panel. The cartridge includes first openings in the first panel and second openings in the second panel. The communication system includes cable connector assemblies received in the first openings. Each cable connector assembly includes a cable connector and cables extending from the cable connector. The cable connector includes signal contacts terminated to ends of the cables. The cable connector having a mating end configured to be mated to a mating connector assembly. The signal contacts and the cables define data channels. The communication system includes bypass connector assemblies received in the second openings. Each bypass connector assembly includes a bypass connector. The bypass connector includes bypass contacts terminated to ends of the corresponding cables. The bypass connector includes a separable mating interface configured to be mated to an active component having a repeater device to restore signals transmitting along the data channels.

DETAILED DESCRIPTION OF THE INVENTION

Figure 1:
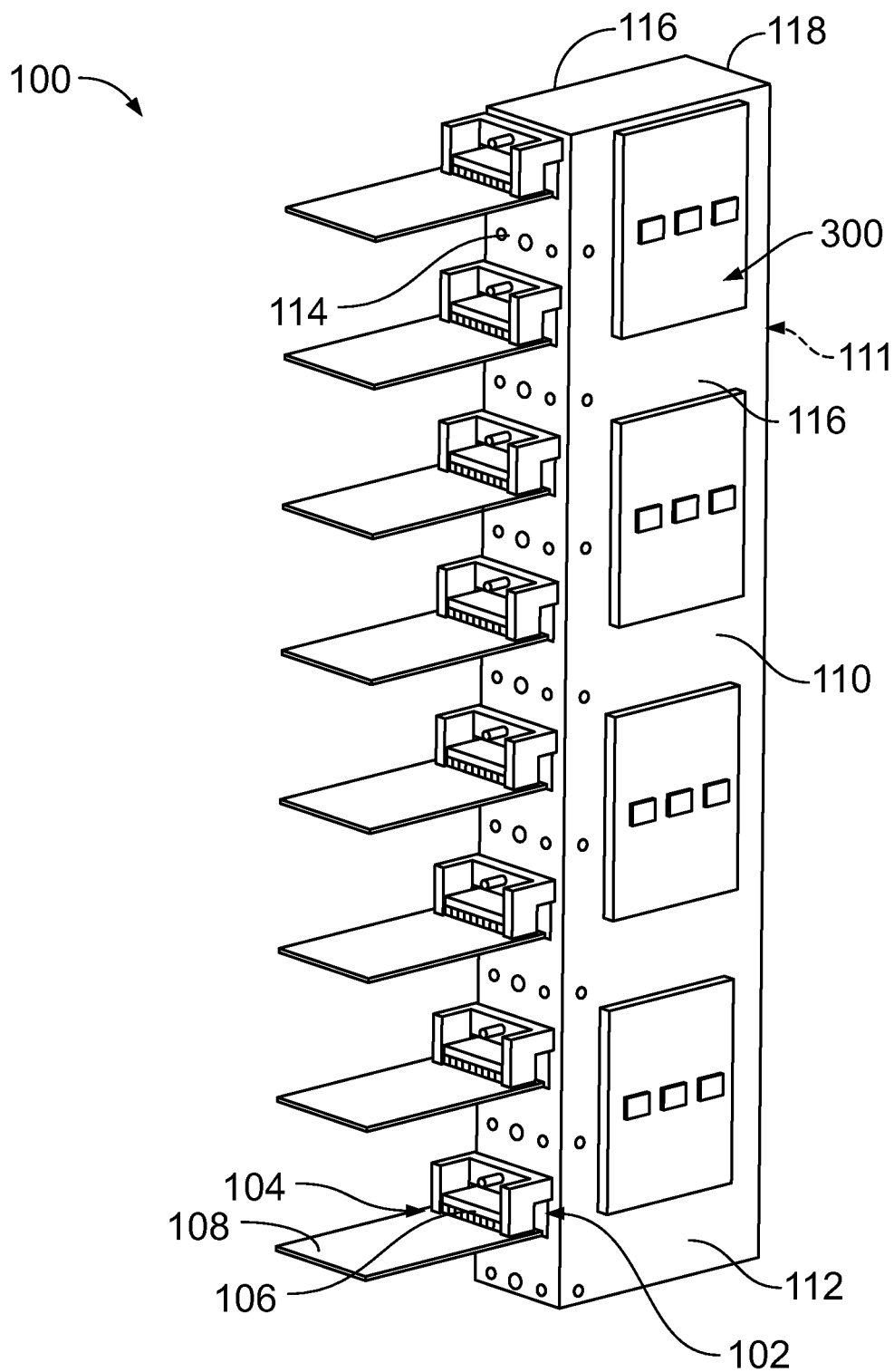
FIG. 1 illustrates a communication system in accordance with an exemplary embodiment.

FIG. 1 illustrates a communication system 100 in accordance with an exemplary embodiment. The communication system 100 includes at least one cable connector assembly 102 and at least one mating connector assembly 104 mated with the corresponding at least one cable connector assembly 102. In the illustrated embodiment, each mating connector assembly 104 includes a mating electrical connector 106 mounted to a circuit board 108, such as a backplane, a daughter card, a network switch, and the like. In various embodiments, the communication system 100 may include an equipment rack or chassis that supports the circuit boards 108. The circuit boards 108 may be pluggable into the equipment rack or chassis to mate the mating electrical connector 106 with the corresponding cable connector assembly 102.

The communication system 100 includes at least one bypass connector assembly 200 and at least one active module 300 coupled to the corresponding bypass connector assemblies 200. The active modules 300 provides active signaling for the signals or data channels passing through the communication system. The active modules 300 are electrically coupled to the cables of the cable connector assemblies 102 through the bypass connector assemblies 200. The active modules 300 restore or enhance the signals transmitted along the data channels. The active modules 300 may be connected between any of the various cable connector assemblies 102. Optionally, the active modules 300 may be connected to multiple cable connector assemblies 102.

In an exemplary embodiment, the communication system 100 includes a cabinet or cartridge 110 that holds the cable connector assemblies 102. The cartridge 110 may be coupled to the rack or chassis that receives the circuit boards 108. The cartridge 110 forms an enclosed space or chamber 111 for the cable connector assemblies 102 and cables 150 (shown in FIG. 5) extending from the cable connector assemblies 102. The cables 150 may be routed within the enclosed space formed by the cartridge 110 to electrically connect between the various cable connector assemblies 102.

In an exemplary embodiment, the cartridge 110 is formed from a plurality of panels 112, such as sheet metal panels. The cartridge 110 includes a front panel 114, side panels 116, and a rear panel 118. The panels 112 may additionally include an upper panel and/or a lower panel. The cable connector assemblies 102 are provided at the front panel 114 for mating with the mating electrical connectors 106. In an exemplary embodiment, the cable connector assemblies 102 are arranged in a column along the front panel 114. Optionally, the cable connector assemblies 102 may be provided in multiple columns. The mating electrical connectors 106 are external to the cartridge 110. The bypass connector assemblies 200 are provided at a different panel, such as one or both of the side panels 116 or the rear panel 118 for mating with the active module 300. The active module 300 is external to the cartridge 110. In an exemplary embodiment, the bypass connector assemblies 200 are arranged in a column along the side panel 116. Optionally, the bypass connector assemblies 200 may be provided in multiple columns.

Figure 2:
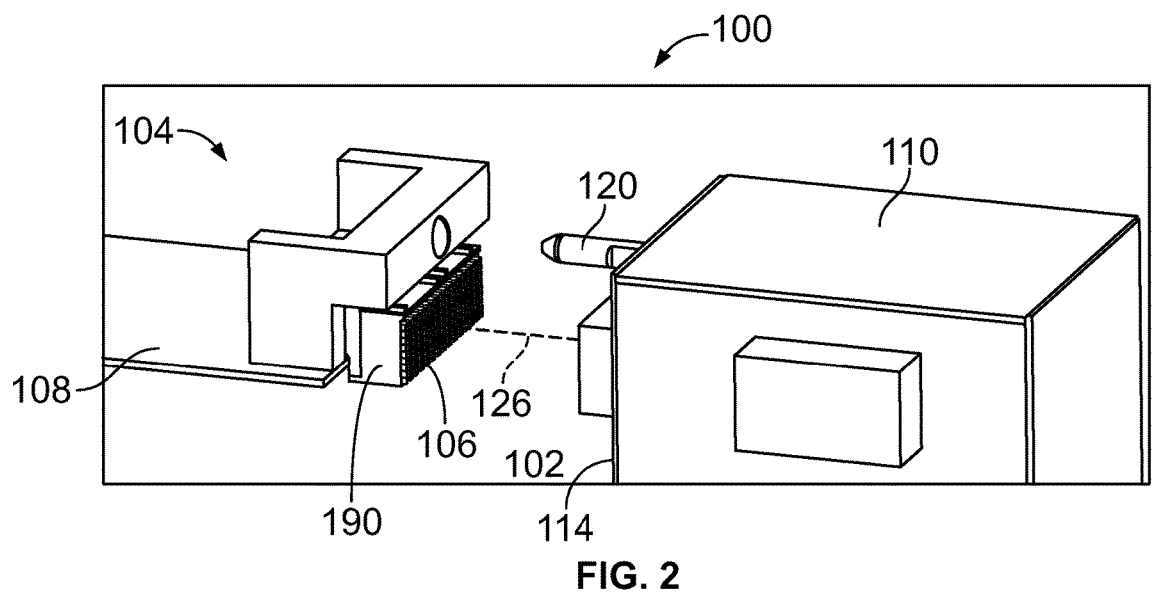
FIG. 2 is a perspective view of a portion of the communication system showing one of the mating connector assemblies poised for coupling to the corresponding cable connector assembly in accordance with an exemplary embodiment.

FIG. 2 is a perspective view of a portion of the communication system 100 showing one of the mating connector assemblies 104 poised for coupling to the corresponding cable connector assembly 102. In the illustrated embodiment, the mating connector assembly 104 is a network component. For example, the mating connector assembly 104 may be a compute node, a memory module, a network switch, a storage device, a network accelerator, or another type of communication component. The mating connector assembly 104 may be a backplane component or a daughtercard component.

In an exemplary embodiment, the mating electrical connector 106 of the mating connector assembly 104 is mounted to a front edge of the circuit board 108. The mating electrical connector 106 includes a connector housing 190 holding signal contacts (not shown). The signal contacts are terminated to the circuit board 108. The signal contacts may be socket contacts. The mating electrical connector 106 may includes shields providing shielding for the signal contacts.

The cable connector assembly 102 is received in the cartridge 110. The cable connector assembly 102 is provided at the front panel 114 for mating with the mating connector assembly 104 along a mating axis 126. The connector assemblies 102, 300 are configured to transmit and/or receive data through an interface. The connector assemblies 102, 300 may includes connectors, such as plug or receptacle connectors.

In an exemplary embodiment, a mating guide 120 is provided to guide mating of the mating electrical connector 106 with the cable connector assembly 102. In the illustrated embodiment, the mating guide 120 includes a guide post extending forward of the mating ends of the cable connector assembly 102. The mating guide 120 may be used to align the connectors in one or more lateral directions transverse to the mating axis 126, such as in a horizontal direction and/or a vertical direction. Other types of guide features may be used in alternative embodiments.

Figure 3:
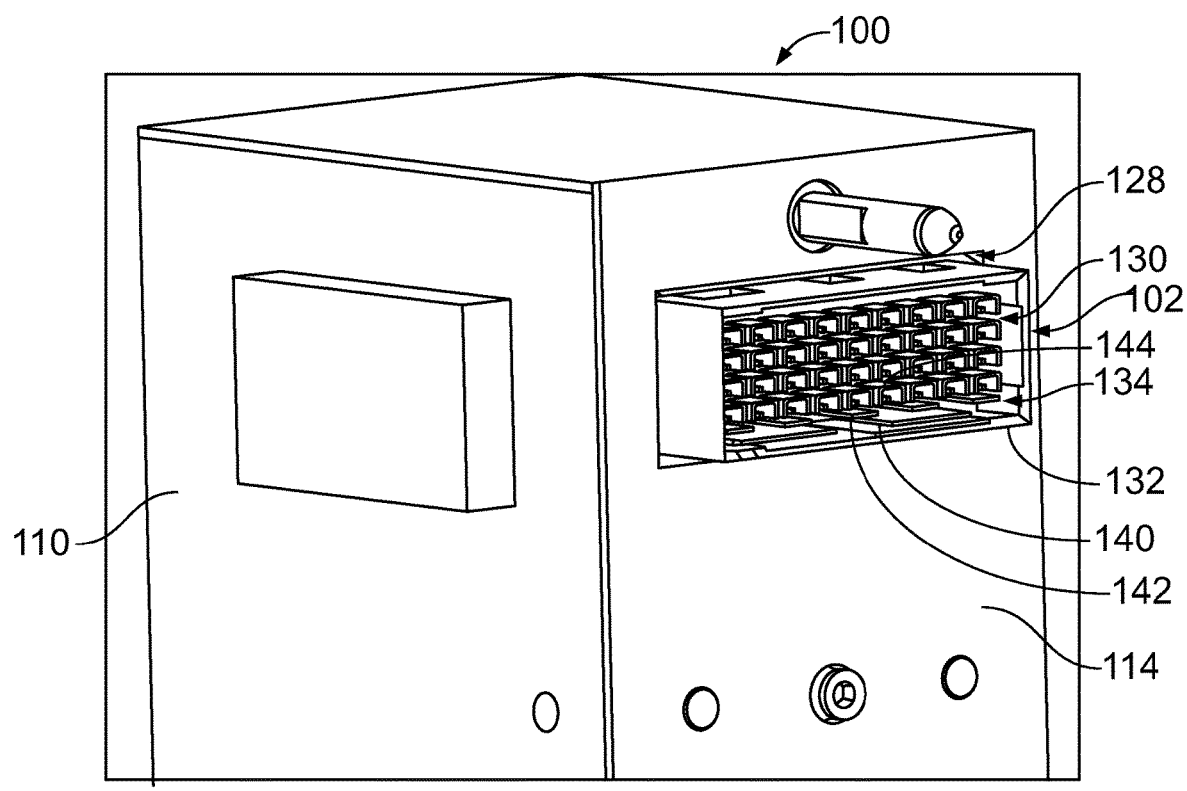
FIG. 3 is a front perspective view of a portion of the communication system showing one of the cable connector assemblies coupled to the cartridge in accordance with an exemplary embodiment.

FIG. 3 is a front perspective view of a portion of the communication system 100 showing one of the cable connector assemblies 102 coupled to the cartridge 110. The cable connector assembly 102 includes a cable connector 130. The mating end of the cable connector 130 passes through an opening 128 in the front panel 114 for mating with the mating electrical connector 106 (FIG. 2).

The cable connector 130 includes a connector housing 132 holding contact assemblies 140. The connector housing 132 includes a cavity 134 that receives the mating end of the mating electrical connector 106. The contact assemblies 140 are arranged in the cavity 134, such as in rows and columns. The walls of the connector housing 132 may be chamfered and have a lead-in surfaces to guide mating of the mating electrical connector 106 in the cavity 134. The connector housing 132 may have guide features to properly position the mating electrical connector 106 within the cavity 134.

Each contact assembly 140 includes at least one signal contact 142, which is configured to be electrically connected to a corresponding conductor of a cable 150 extending from the cable connector 130. In the illustrated embodiment, each contact assembly 140 includes a pair of the signal contacts 142, which define a differential pair. In various embodiments, the signal contacts 142 may be pin contacts. However, in alternative embodiments, the signal contacts 142 may be socket contacts, spring beam contacts, or other types of contacts. The signal contacts 142 may be stamped and formed contacts. Each contact assembly 140 includes a shield 144 provide electrical shielding for the signal contacts 142. The shield 144 is configured to be electrically connected to the cable shield of the cable 150. In the illustrated embodiment, the shield 144 is C-shaped providing electrical shielding on three sides of the pair of signal contacts 142. The shield 144 may have other shapes in alternative embodiments. The shield 144 may be a stamped and formed shield.

Figure 4:
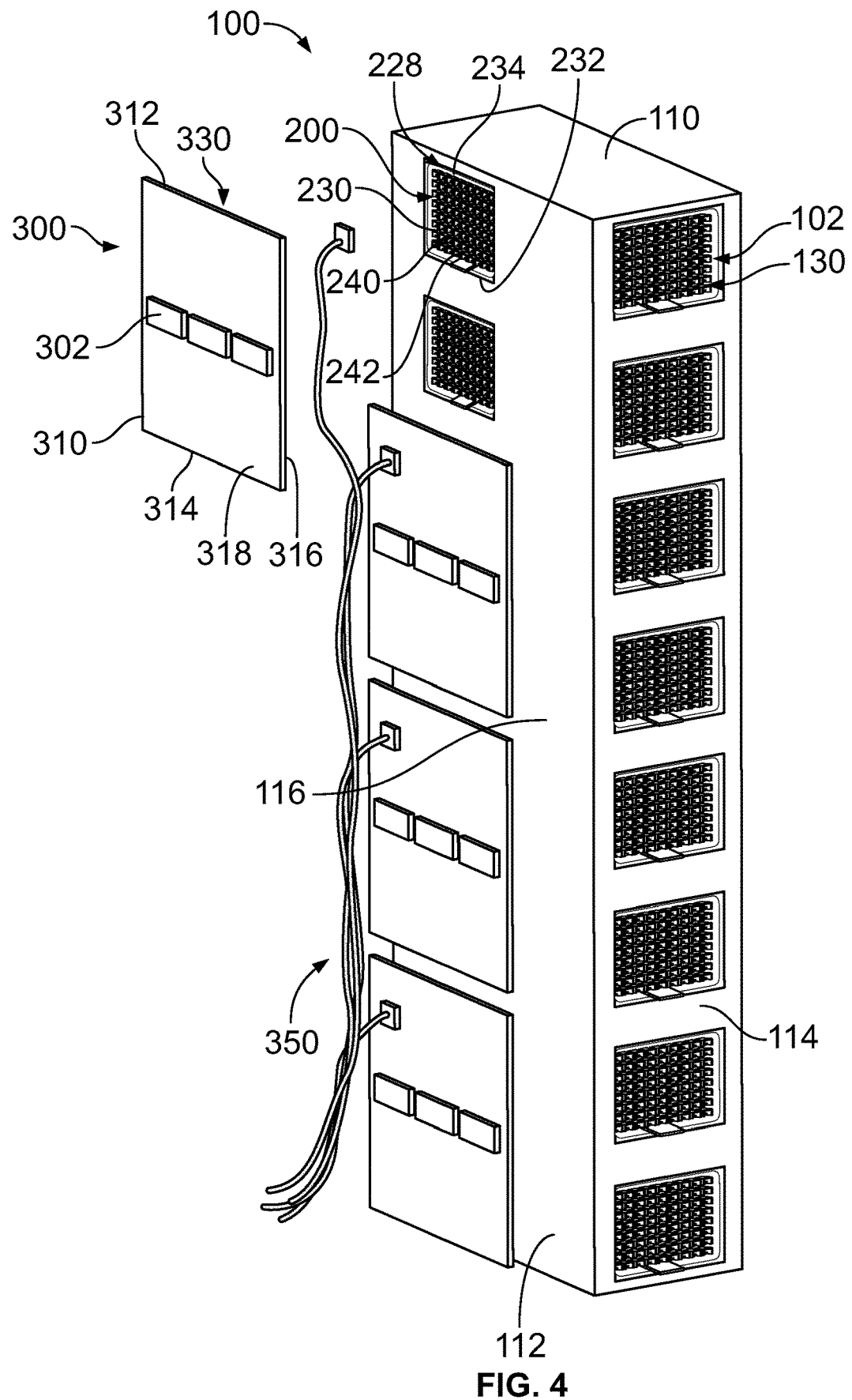
FIG. 4 is a front perspective view of a portion of the communication system showing one of the active modules poised for coupling to the corresponding bypass connector assemblies in accordance with an exemplary embodiment.
Figure 5:
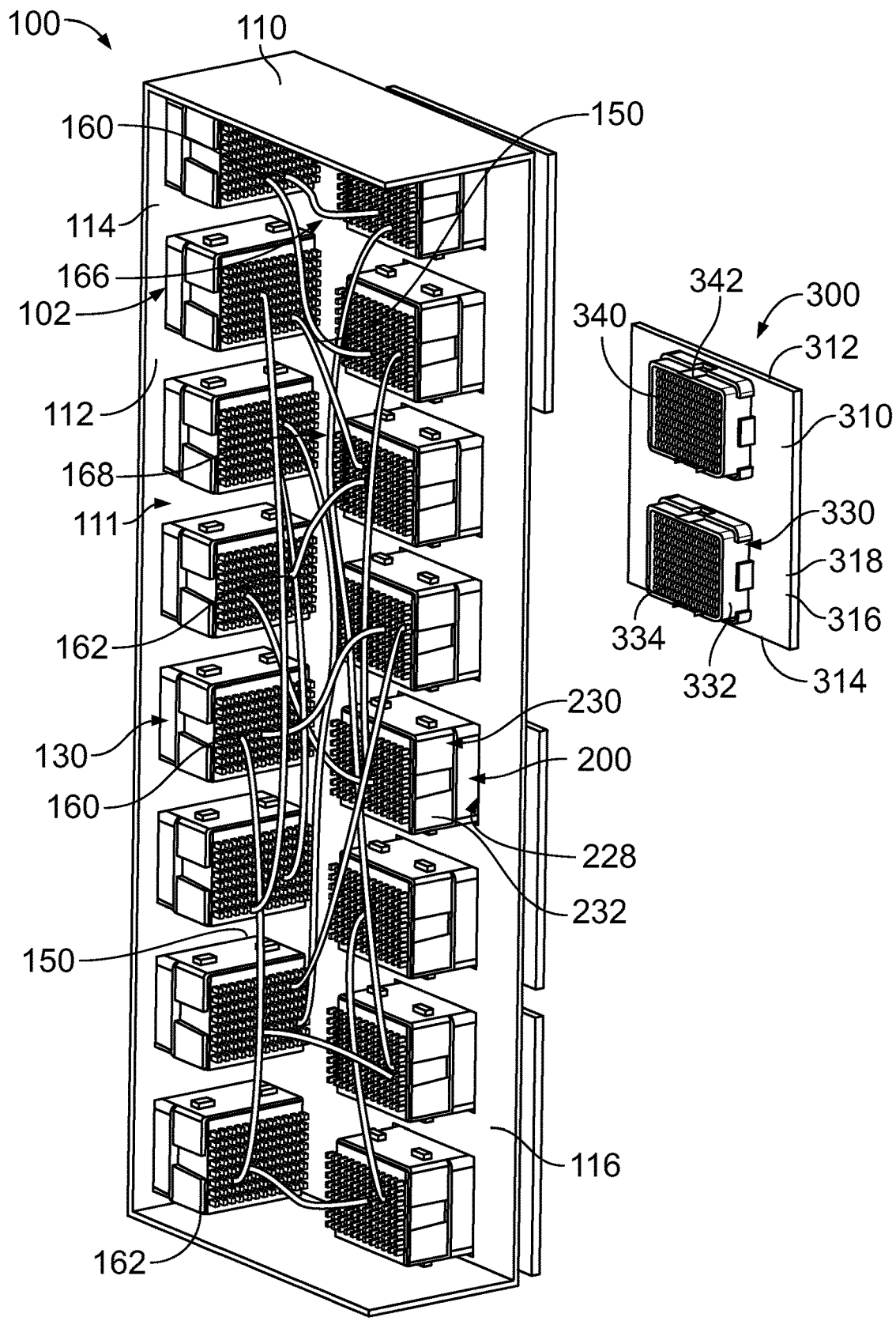
FIG. 5 is a rear perspective view of a portion of the communication system with a portion of the cartridge removed to illustrate the internal components of the communication system in accordance with an exemplary embodiment.

FIG. 4 is a front perspective view of a portion of the communication system 100 showing one of the active modules 300 poised for coupling to the corresponding bypass connector assemblies 200. FIG. 5 is a rear perspective view of a portion of the communication system 100 with a portion of the cartridge 110 removed to illustrate the internal components of the communication system 100.

The cable connector assemblies 102 are arranged at the front panel 114. The bypass connector assemblies 200 are arranged along the side panel 116. The bypass connector assemblies 200 may be movable relative to the side panel 116 (for example, horizontally and/or vertically) to align for mating with the active module 300. For example, a spring-loaded mounting bracket may hold the bypass connector assembly 200 relative to the side panel 116. The bypass connector assemblies 200 provide an additional mating interface for the communication system 100 on the side of the cartridge 100. The active modules 300 are coupled to the bypass connector assemblies 200 at the side panel 116. The cables 150 extend from the cable connectors 130. The cables 150 are routed between the various cable connectors 130. For example, at least some of the cables 150 may be routed directly from one cable connector 130 to another cable connector 130. In an exemplary embodiment, at least some of the cables 150 are routed from the cable connectors 130 to the bypass connector assemblies 200. The data channels of such cables 150 are processed by the active modules 300 to provide active signaling for the signals, such as to restore or enhance the signals transmitted along the data channels. The communication system 100 may have any combination of passive and active links between the mating connector assemblies 104. For example, a first subset of the cables 150 may be routed to the corresponding bypass connector assemblies 200 and a second subset of the cables 150 may be routed directly between different cable connector assemblies 102.

In an exemplary embodiment, each cable 150 is a twinaxial cable having a first conductor and a second conductor in a core of the cable 150. The cables 150 extend between a first end 160 and a second end 162. The first end 160 is configured to be coupled to a first cable connector 130 and the second end 162 is configured to be coupled to a second cable connector 130. Optionally, some of the cables 150 may be continuous between the first end 160 and the second end 162 (for example, single cable). Optionally, some of the cables 150 may be split at an intermediate location into different cable sections to bypass the data channels through the active module 300. For example, the active module 300 is located remote from the first end 160 and is located remote from the second end 162. Such cables 150 include first sections 166 between the first end 160 and the active module 300 and second sections 168 between the second end 162 and the active module 300.

In various embodiments, the intermediate location may be approximately centered between the first and second ends 160, 162. For example, the first and second sections 166, 168 may have approximately equal lengths. In other embodiments, the intermediate location may be located closer to one of the ends, such closer to the first end 160 or closer to the second end 162 such that the first and second sections 166, 168 have different lengths. The intermediate location 164 may be selected based on channel lengths of the transmission lines, such as being located near an end of an allowable channel length per protocol specification, such as PCIe, Ethernet, Infiniband, NVlink, and the like.

Each bypass connector assembly 200 includes a bypass connector 230 coupled to the cartridge 110, such as at the side panel 116. The mating end of the bypass connector 230 passes through an opening 228 in the side panel 116 for mating with the active module 300. The bypass connector 230 includes a connector housing 232 holding contact assemblies 240. The connector housing 232 includes a cavity 234. The contact assemblies 240 are arranged in the cavity 234, such as in rows and columns. The walls of the connector housing 232 may be chamfered and have a lead-in surfaces. The connector housing 232 may have guide features to guide mating with the active module 300.

Each contact assembly 240 includes at least one signal contact 242, which is configured to be electrically connected to the conductor of the corresponding cable 150. In the illustrated embodiment, each contact assembly 240 includes a pair of the signal contacts 242, which define a differential pair. In various embodiments, the signal contacts 242 may be pin contacts. However, in alternative embodiments, the signal contacts 242 may be socket contacts, spring beam contacts, or other types of contacts. The signal contacts 242 may be stamped and formed contacts. Each contact assembly 240 may include shields to provide electrical shielding for the signal contacts 242.

In an exemplary embodiment, the active module 300 includes one or more repeater devices 302 to restore signals transmitted along the data channels of the corresponding cables 150. The active modules 300 can be strategically placed and the cables can be strategically routed to connect to corresponding active modules 300 to meet budget constraints on the data channels. In the illustrated embodiment, the active module 300 includes three of the repeater devices 302; however, the active module 300 may include greater or fewer repeater devices 302 in alternative embodiments. Each repeater device 302 includes an integrated circuit. The repeater device 302 operates as a channel reach extension device to extend the transmission line length along the data channels. For example, when the channel length of the data channel between the cable connectors 130 is longer than an allowable channel length, such as per protocol specifications, the repeater device 302 restores the signals by bypassing the data channels through the active module 300 such that the distance between the cable connectors 130 and the repeater device 302 is shorter than the allowable channel length. The repeater device 302 allows reliable, error-free communication for the communication system 100. The repeater device 302 is configured to restore the signals at some point midway between the cable connectors 130. The active modules 300 and repeater devices 302 are at the exterior such that the active modules 300 are serviceable and may be field replaceable. The repeater devices 302 are exposed at the exterior of the cartridge 110, such as for active or passive cooling of the repeater devices 302.

The repeater device 302 may be a re-timer device in various embodiments. In various embodiments, the re-timer device may be an x-16 re-timer device having sixteen channels. The re-timer device is configured to retransmit a fresh copy of the original signal. The re-timer device may be a mixed signal analog/digital device that is protocol-aware and has the ability to fully recover the data, extract the embedded clock and retransmit a fresh copy of the data using a clean clock. The re-timer device may include a continuous time linear equalizer (CTLE) and a wideband gain stage. The re-timer device may include a clock and data recovery (CDR) circuit, a decision feedback equalizer (DFE) and a transmit (Tx) finite impulse response (FIR) driver. The re-timer device may include a finite state machines (FSMs) and/or a microcontroller to manage the automatic adaptation of the CTLE, wideband gain, DFE and FIR driver, and implement a link training and status state machine (LTSSM). The re-timer device may actively participate in the protocol. The re-timer device may fully recover the data stream and retransmit the data signal on a clean clock to enable extension of the channel to twice the original specification. The DFE of the re-timer device compensates for reflections in the channel response caused by impedance discontinuities in board vias, connectors and package socket-board interfaces along the data transmission line. The re-timer device may examine the received signal and adjust the CTLE and DFE to minimize the bit error rate (BER). The transmitter of the re-timer device may adjust de-emphasis and pre-shoot equalization to minimize BER according to equalization protocol. The re-timer device may have tools for assessing the electrical performance (internal eye monitors, pattern generators, pattern checkers) and protocol performance (link state history monitors, timeout adjustments). The re-timer device may compensate and reset any lane-to-lane skew, effectively doubling the specification budget.

The repeater device 302 may be a re-driver device in various embodiments. The re-driver device is configured to amplify the signal that is transmitted downstream of the re-driver device. The re-driver device may be an analog reach extension device designed to boost the high-frequency portions of the signal, such as to counteract frequency-dependent attenuation along the data channel. The re-driver device may include a continuous time linear equalizer (CTLE), a wideband gain stage and a linear driver. The re-driver device may include receive (RX) side equalizer (EQ) to compensate for frequency-dependent attenuation due to PCB traces or cable conductors along the transmission line. The CTLE may function to open the closed eye of the distorted waveform. The transmit (TX) side of the re-driver device may include a pre-emphasis function (transmit equalizer) to pre-shape the transmit waveform.

The active module 300 includes a module circuit board 310 having a first end 312 and a second end 314. The module circuit board 310 includes an inner surface 316 and an outer surface 318. The integrated circuit may be provided at the outer surface 318 or the inner surface 316 and connected to circuits of the module circuit board 310. Other electrical components may be mounted to the module circuit board 310 at the inner surface 316 and/or the outer surface 318, such as capacitors, transistors, resistors, memory components, microcontrollers, EEPROM devices, and the like.

The active module 300 includes at least one module connector 330 coupled to the module circuit board 310 for mating with the corresponding bypass connectors 230. In the illustrated embodiment, each active module 300 includes two of the module connectors 330, which may be electrically connected by traces or circuits of the module circuit board 310. The module connectors 330 are provided at the inner surface 316 of the module circuit board 310 to face the cartridge 110. The mating end of the module connector 330 is configured to be mated with the mating end of the corresponding bypass connector 230. The mating end defines a separable mating interface to allow removal of the module connector 330 and the active module 300. Guide elements, such as guide pins, may extend from the module circuit board 310 or the module connectors 330 to guide mating with the bypass connectors 230. The module connector 330 includes a connector housing 332 holding contact assemblies 340. The connector housing 332 includes a cavity 334. The contact assemblies 340 are arranged in the cavity 334, such as in rows and columns. The walls of the connector housing 332 may be chamfered and have a lead-in surfaces for mating with the bypass connector 230. The connector housing 332 may have guide features (for example, guide pins) to guide mating with the bypass connector 230.

Each contact assembly 340 includes at least one signal contact 342, which is configured to be electrically connected to the signal contact 242 of the bypass connector 230. The signal contact 342 is configured to be terminated to the module circuit board 310, such as being soldered or press fit to the module circuit board 310. In the illustrated embodiment, each contact assembly 340 includes a pair of the signal contacts 342, which define a differential pair. In various embodiments, the signal contacts 342 may be pin contacts. However, in alternative embodiments, the signal contacts 342 may be socket contacts, spring beam contacts, or other types of contacts. The signal contacts 342 may be stamped and formed contacts. Each contact assembly 340 may include shields to provide electrical shielding for the signal contacts 342.

In an exemplary embodiment, the communication system 100 includes a power assembly 350 for supplying power to the active modules 300. The power assembly 350 may include a wire harness or busbar with power connectors coupled to the active modules 300 to supply power to the active modules 300. In other various embodiments, the power assembly 350 supplies power directly to the module connectors 330, such as through the bypass connectors 230. The power may be supplied by corresponding power cables. The power cables may extend from the cable connectors 130. For example, the power may be supplied by the mating connector assembly 104. The power assembly 350 may be located within the chamber 111 of the cartridge 110. Alternatively, the power assembly 350 may be located exterior of the cartridge 110, such as being routed along the panels 112.

Figure 6:
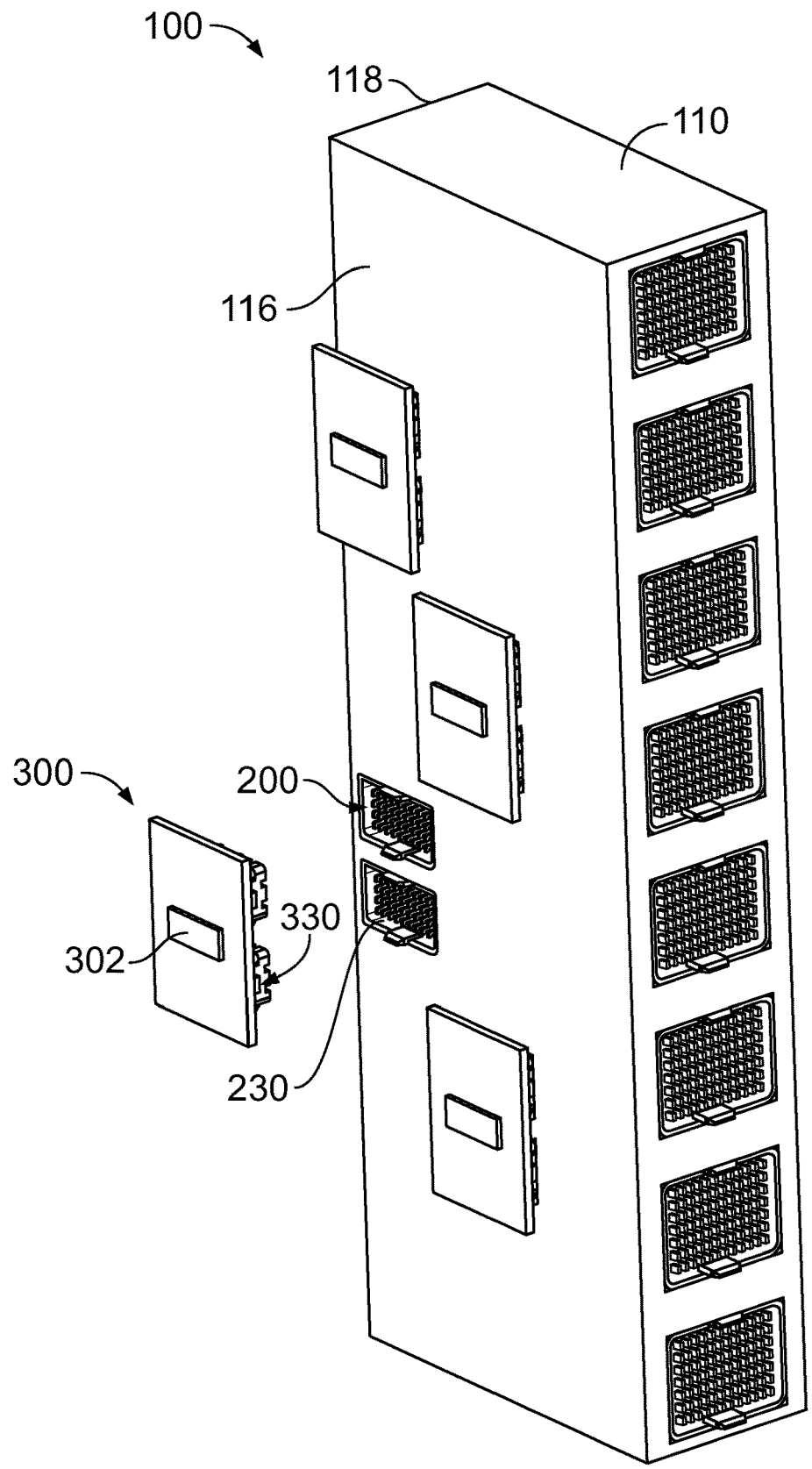
FIG. 6 is a front perspective view of a portion of the communication system showing one of the active modules poised for coupling to the corresponding bypass connector assemblies at the first side of the cartridge in accordance with an exemplary embodiment.
Figure 7:
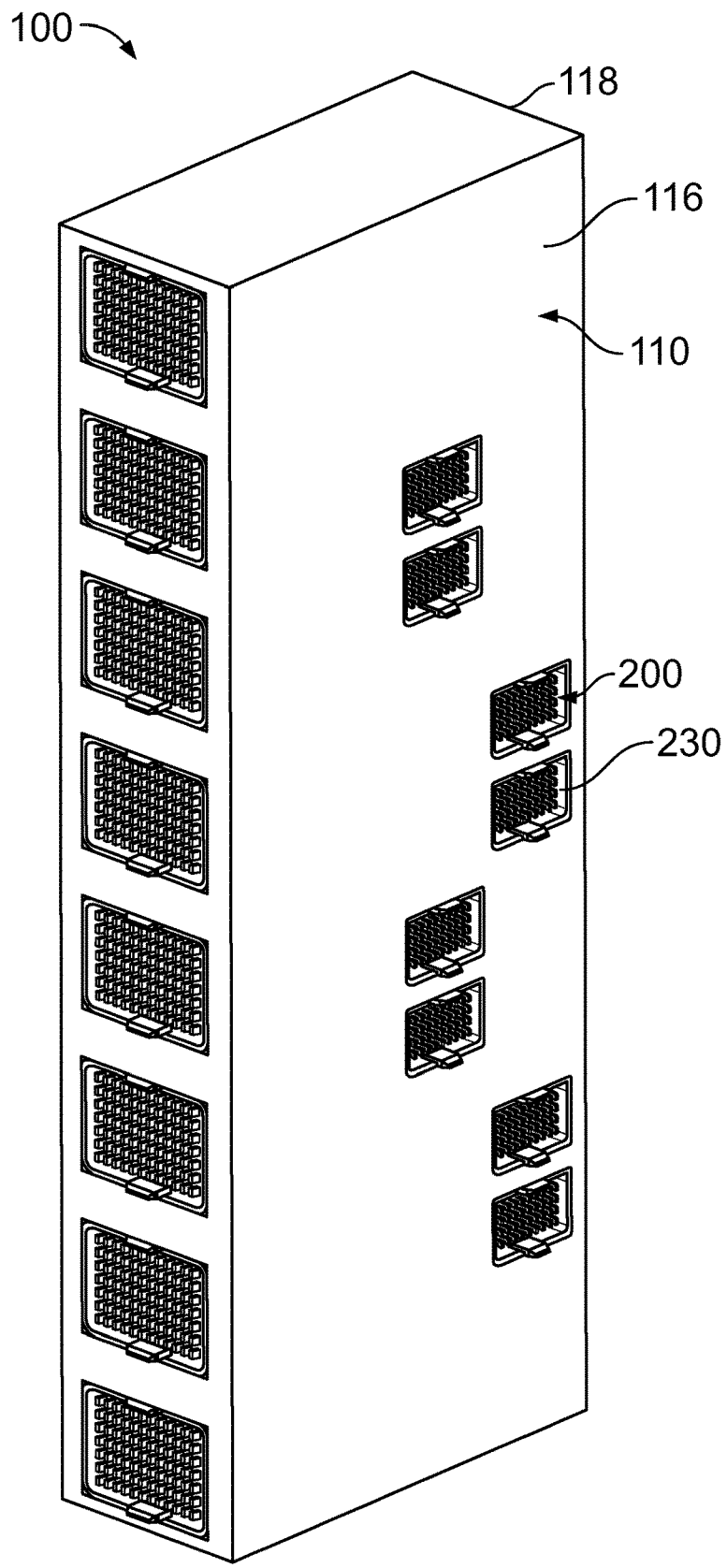
FIG. 7 is a front perspective view of a portion of the communication system showing the bypass connector assemblies at the second side of the cartridge in accordance with an exemplary embodiment.

FIG. 6 is a front perspective view of a portion of the communication system 100 showing one of the active modules 300 poised for coupling to the corresponding bypass connector assemblies 200 at the first side 116 of the cartridge 110. FIG. 7 is a front perspective view of a portion of the communication system 100 showing the bypass connector assemblies 200 at the second side panel 116 of the cartridge 110.

The active modules 300 shown in FIG. 6 are smaller than the active modules 300 shown in FIG. 4. For example, the module circuit card 310 is smaller (for example, shorter and narrower than the embodiment of FIG. 4). In the illustrated embodiment, the active module 300 includes a single repeater device 302 rather than multiple repeater devices 302. In the illustrated embodiment, the module connectors 330 and the bypass connectors 230 are smaller and may include fewer signal contacts. In an exemplary embodiment, the bypass connectors 230 are arranged in offset pairs (for example, offset front to rear) to allow offset placement of the active modules 300. Offsetting the bypass connectors 230 allows tighter placement of the active modules 300.

Figure 8:
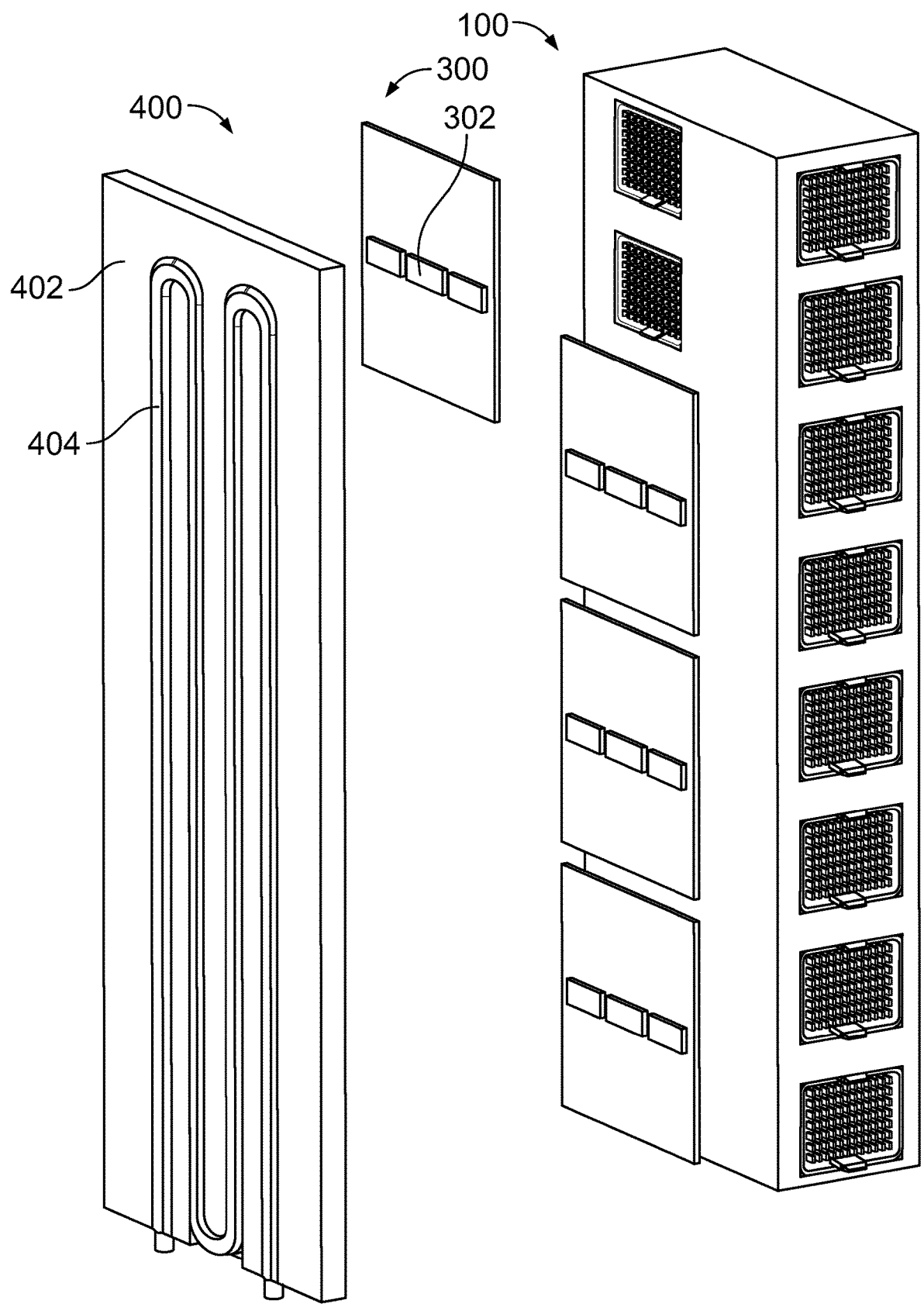
FIG. 8 is an exploded view of the communication system in accordance with an exemplary embodiment showing a cooling system for cooling the active modules.
Figure 9:
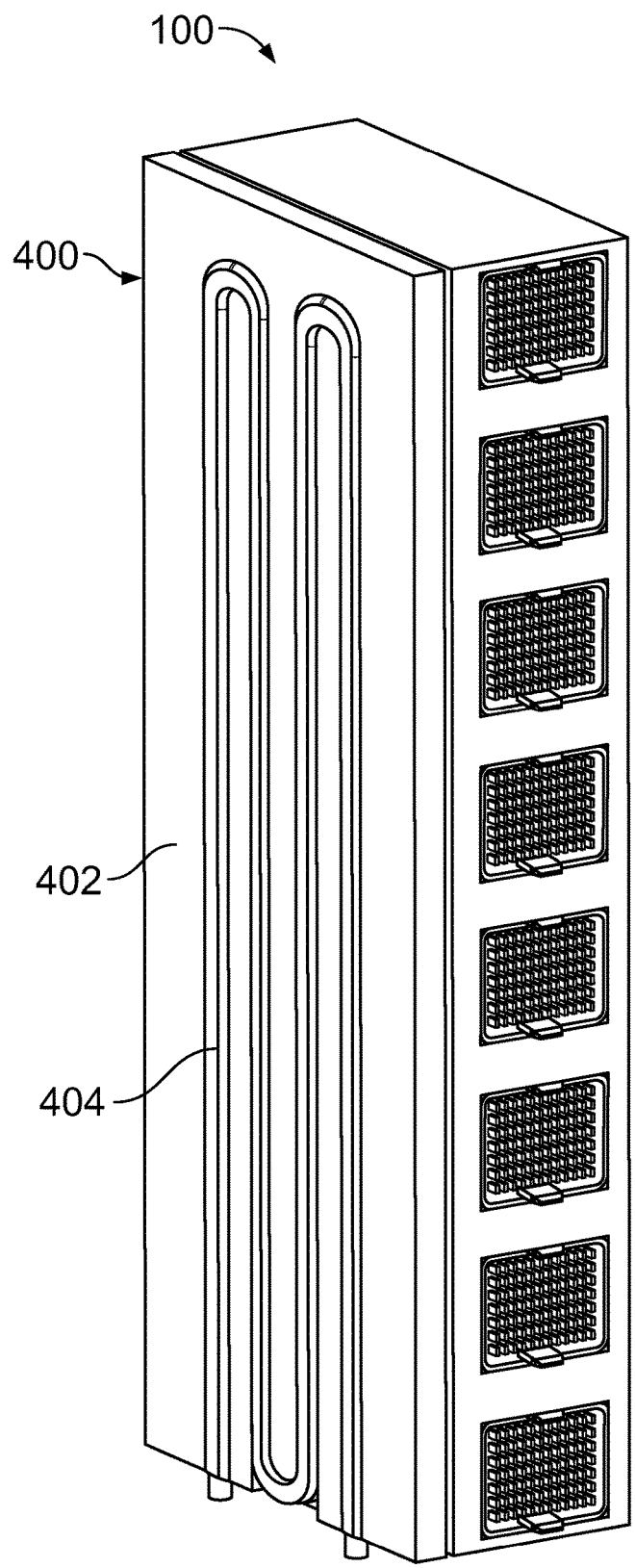
FIG. 9 is an assembled view of the communication system showing the cooling system in accordance with an exemplary embodiment.
Figure 10:
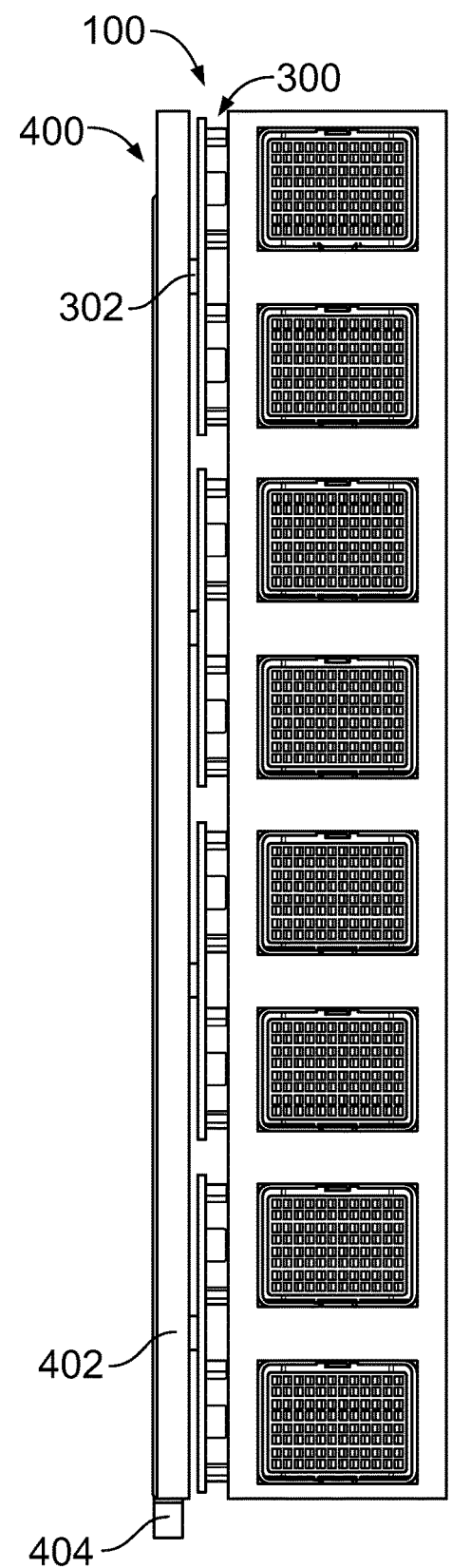
FIG. 10 is a front view of the communication system showing the cooling system in accordance with an exemplary embodiment.

FIG. 8 is an exploded view of the communication system 100 in accordance with an exemplary embodiment showing a cooling system 400 for cooling the active modules 300. FIG. 9 is an assembled view of the communication system 100 showing the cooling system 400 in accordance with an exemplary embodiment. FIG. 10 is a front view of the communication system 100 showing the cooling system 400 in accordance with an exemplary embodiment.

In an exemplary embodiment, the cooling system 400 includes a cold plate 402 having a cooling channel 404. Cooling fluid may be passed through the cooling channel 404 to enhance heat dissipation. The cold plate may be manufactured from a thermally conductive material, such as a metal material (for example, aluminum). The cold plate 402 is thermally coupled to the repeater devices 302 to dissipate heat from the repeater devices 302.

Figure 11:
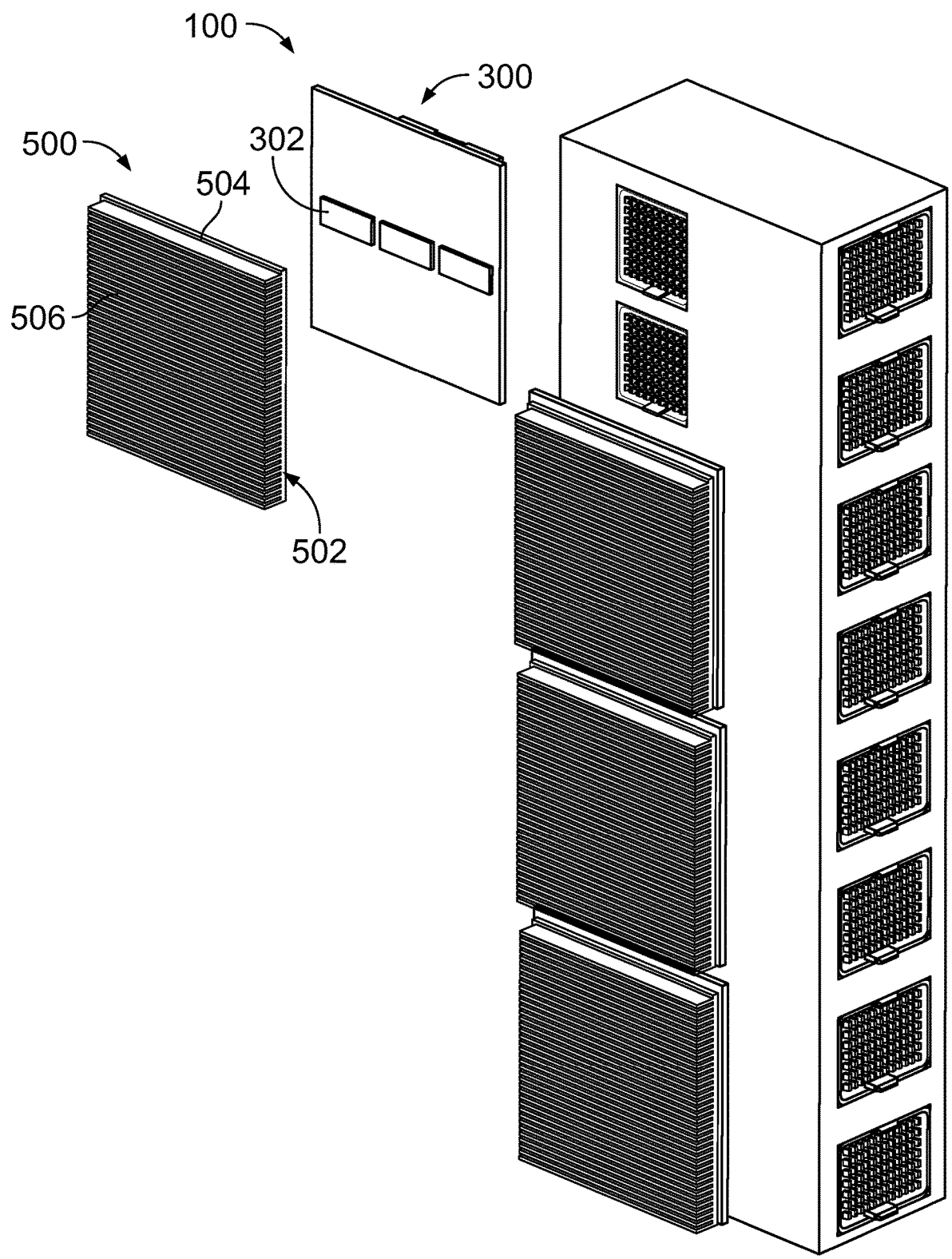
FIG. 11 is an exploded view of the communication system in accordance with an exemplary embodiment showing a cooling system for cooling the active modules.
Figure 12:
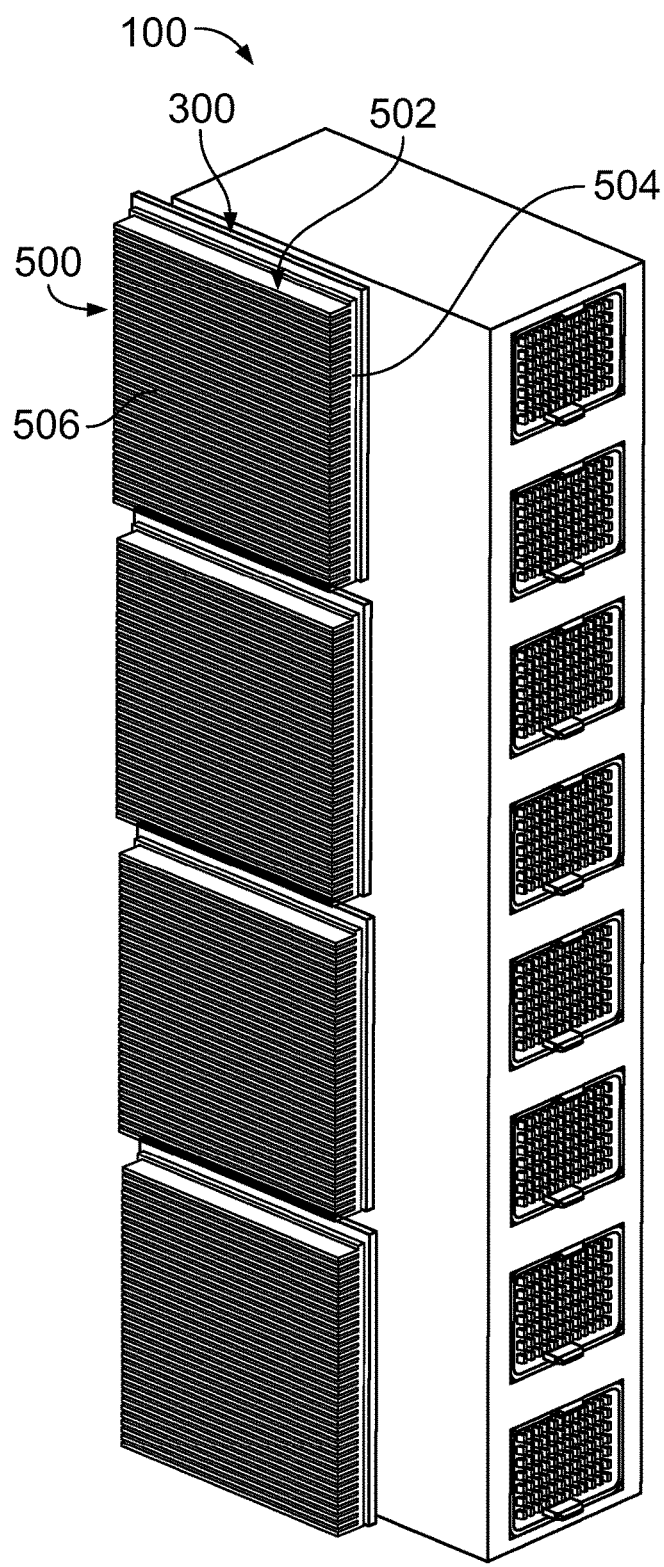
FIG. 12 is an assembled view of the communication system showing the cooling system in accordance with an exemplary embodiment.
Figure 13:
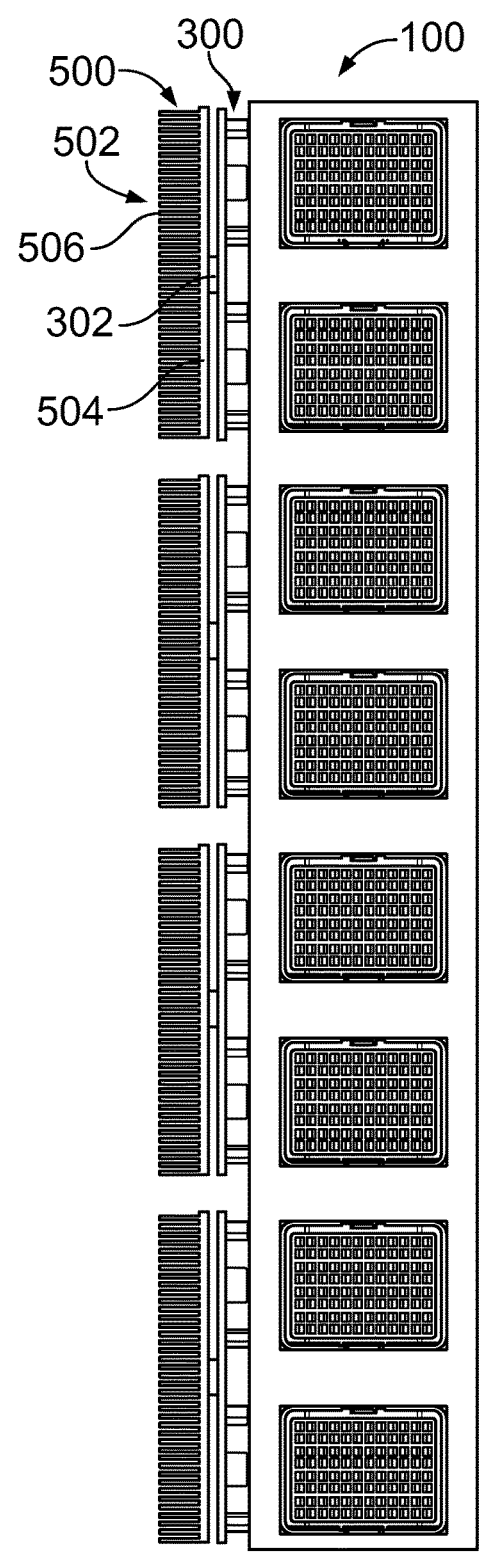
FIG. 13 is a front view of the communication system showing the cooling system in accordance with an exemplary embodiment.

FIG. 11 is an exploded view of the communication system 100 in accordance with an exemplary embodiment showing a cooling system 500 for cooling the active modules 300. FIG. 12 is an assembled view of the communication system 100 showing the cooling system 500 in accordance with an exemplary embodiment. FIG. 13 is a front view of the communication system 100 showing the cooling system 500 in accordance with an exemplary embodiment.

In an exemplary embodiment, the cooling system 500 includes heatsinks 502 for dissipating heat form the active modules 300. The heatsink 502 includes a base 504 thermally coupled to the repeater devices 302 and heat dissipating fins 506 extending from the base 504. Fans may be used to enhance airflow over the heat dissipating fins 506 to improve heat dissipation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A communication system comprising:
a cartridge having panels forming a chamber, the panels including a first panel and a second panel different than the first panel, the cartridge including first openings in the first panel and second openings in the second panel;
cable connector assemblies received in the first openings, each cable connector assembly including a cable connector and cables extending from the cable connector, the cables defining data channels;
bypass connector assemblies received in the second openings, each bypass connector assembly including a bypass connector connected to the cables of the corresponding cable connector assemblies; and
an active module coupled to the corresponding bypass connector assemblies, the active module including a repeater device restoring signals transmitting along the data channels.

2. The communication system of claim 1, wherein each bypass connector includes a separable mating interface, the active module being removably coupled to the bypass connectors at the separable mating interfaces.

3. The communication system of claim 1, wherein the repeater device is located inline between the corresponding bypass connector assemblies.

4. The communication system of claim 1, wherein the active module includes a module circuit board, a first module connector mounted to the module circuit board, and a second module connector mounted to the module circuit board, the repeater device being mounted to the module circuit board inline between the first and second module connectors, the first and second module connectors being mated to the corresponding bypass connectors.

5. The communication system of claim 1, wherein the cables extend between a first end configured to be coupled to a first cable connector of the cable connectors and a second end configured to be coupled to a second cable connector of the cable connectors, the cable including a first portion extending to the first end and a second portion extending to the second end, the first portion being coupled to a first bypass connector of the bypass connectors, the second portion being coupled a second bypass connector of the bypass connectors.

6. The communication system of claim 1, wherein the active module is located along the data channels remote from the cable connectors of the cable connector assemblies.

7. The communication system of claim 1, wherein the first panel is a front panel at a front of the cartridge, the second panel is a side panel at a side of the cartridge, the cable connectors having forward facing mating ends, the bypass connectors having mating ends facing in a direction perpendicular to the forward facing mating ends of the cable connectors.

8. The communication system of claim 1, wherein each cable connector assembly includes a plurality of the cables extending from the cable connector, wherein a first subset of the cables are routed to the corresponding bypass connector assemblies and a second subset of the cables are routed to different cable connector assemblies.

9. The communication system of claim 1, further comprising a power assembly supplying power to the active module.

10. The communication system of claim 1, further comprising a cooling assembly thermally coupled to the active module to dissipate heat from the active module.

11. The communication system of claim 1, wherein the active module is a first active module, the communication system further comprising a second active module, the first and second active modules being coupled to different bypass connector assemblies.

12. A communication system comprising:
a cartridge having panels forming a chamber, the panels including a first panel and a second panel different than the first panel, the cartridge including first openings in the first panel and second openings in the second panel;
cable connector assemblies received in the first openings, each cable connector assembly including a cable connector and cables extending from the cable connector, the cables defining data channels;
bypass connector assemblies received in the second openings, each bypass connector assembly including a bypass connector connected to the cables of the corresponding cable connector assemblies; and
an active module removably coupled to the corresponding bypass connector assemblies, the active module includes a module circuit board, a first module connector mounted to the module circuit board, a second module connector mounted to the module circuit board, and a repeater device mounted to the module circuit board, the first and second module connectors being mated to the corresponding bypass connectors, the repeater device located inline between the first and second module connectors, the repeater device restoring signals transmitting along the data channels.

13. The communication system of claim 12, wherein the repeater device is located inline between the corresponding bypass connector assemblies.

14. The communication system of claim 12, wherein the active module is located along the data channels remote from the cable connectors of the cable connector assemblies.

15. The communication system of claim 12, wherein the first panel is a front panel at a front of the cartridge, the second panel is a side panel at a side of the cartridge, the active module being coupled to the bypass connectors at the side of the cartridge.

16. The communication system of claim 12, further comprising a power assembly supplying power to the active module.

17. The communication system of claim 12, further comprising a cooling assembly thermally coupled to the active module to dissipate heat from the active module.

18. A communication system comprising:
a cartridge having panels forming a chamber, the panels including a first panel and a second panel different than the first panel, the cartridge including first openings in the first panel and second openings in the second panel;
cable connector assemblies received in the first openings, each cable connector assembly including a cable connector and cables extending from the cable connector, the cable connector including signal contacts terminated to ends of the cables, the cable connector having a mating end configured to be mated to a mating connector assembly, the signal contacts and the cables defining data channels;
bypass connector assemblies received in the second openings, each bypass connector assembly including a bypass connector, the bypass connector including bypass contacts terminated to ends of the corresponding cables, the bypass connector including a separable mating interface configured to be mated to an active component having a repeater device to restore signals transmitting along the data channels.

19. The communication system of claim 18, wherein the cables extend between a first end configured to be coupled to a first cable connector of the cable connectors and a second end configured to be coupled to a second cable connector of the cable connectors, the cable including a first portion extending to the first end and a second portion extending to the second end, the first portion being coupled to a first bypass connector of the bypass connectors, the second portion being coupled a second bypass connector of the bypass connectors.

20. The communication system of claim 18, wherein the first panel is a front panel at a front of the cartridge, the second panel is a side panel at a side of the cartridge, the cable connectors having forward facing mating ends, the bypass connectors having mating ends facing in a direction perpendicular to the forward facing mating ends of the cable connectors.

* * * * *